April 6, 1965   H. H. HOADLEY ETAL   3,177,446
MEANS INCREASING POPULATION OF SELECTED ENERGY LEVEL OF MASERS
Filed Dec. 12, 1961
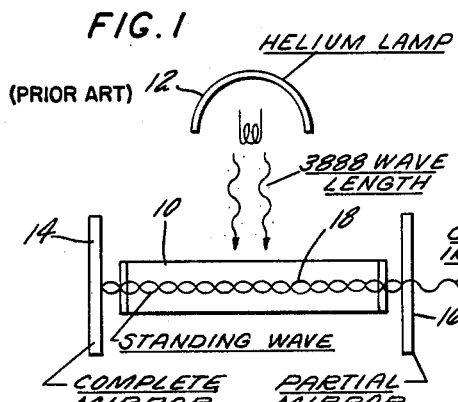
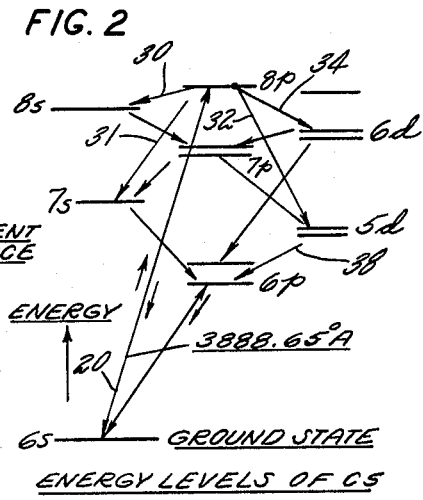
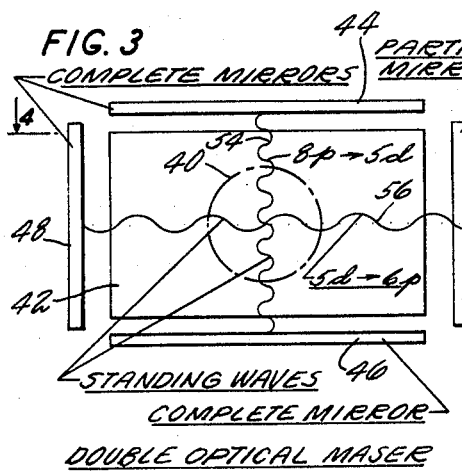
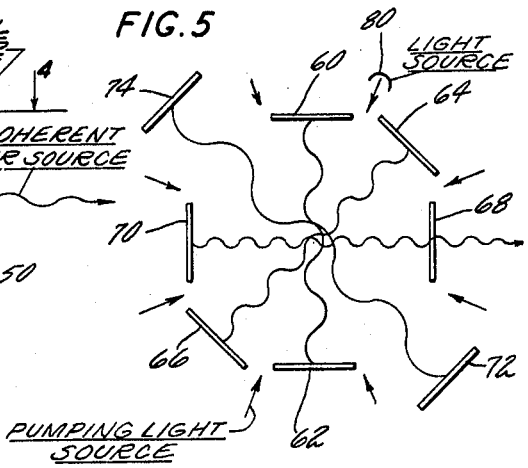
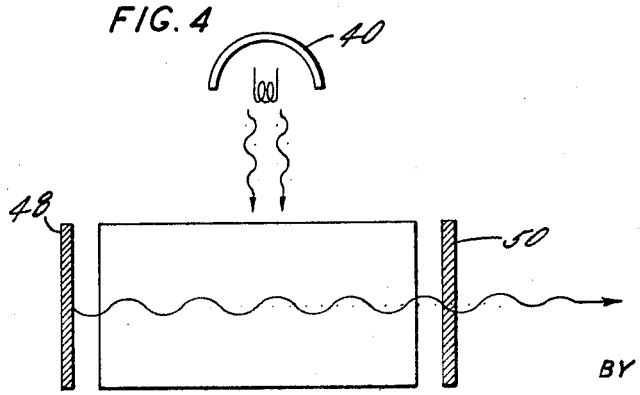
INVENTORS
JOHN B. HAWKES
HENRY H. HOADLEY
BY
ATTORNEY 3,177,446
MEANS INCREASING POPULATION OF SELECTED ENERGY LEVEL OF MASERS
Henry H. Hoadley, South Glastonbury, and John B. Hawkes, West Simsbury, Conn., assignors to United Aircraft Corporation, East Hartford, Conn., a corporation of Delaware
Filed Dec. 12, 1961, Ser. No. 158,685
4 Claims. (Cl. 331—94.5)

This invention relates to a device for the excitation of molecules or atoms of particular elements for the production of particular frequencies of energy or light waves.

The term "maser" is an abbreviation for the microwave amplification by stimulated emission of radiation. When this term is considered with respect to the emission of light the term "maser" is often referred to as a "laser." Hence the phenomena described herein is substantially identical when considering either masers or lasers. Ordinarily, in the art, a maser is a device which entails the use of excited states of molecules to produce particular energy frequencies which are in the microwave or millimeter range. The maser described herein for purposes of illustration utilizes excited states of atoms rather than molecules whereby higher energies are produced and much higher frequencies are involved.

It is a primary object of this invention to provide a maser where, in this particular embodiment, a source of energy acts on a confined quantity of suitable substance such as cesium, for example. The energy source adds energy to the outer electrons of the cesium atoms such that these electrons are raised to energy levels above the ground state of the atom. It is a peculiarity of quantum mechanics that allows any particular outer atomic electron to take on only specific energy levels. This exchange of energy i.e. the emission or absorption of the energy of transition between a higher or lower energy level entails an emission or an absorption of a photon which is of the appropriate frequency.

In quantum mechanics, changes of energy levels, or transitions between such levels, take only certain courses. Thus energy can be absorbed by the atoms so that the electron can, in an instantaneous time measurement, go in cesium $6_s$ from a ground level to an $8_p$ level. (Refer to FIG. 2.)

The numbers and subscripts are merely relative and have reference to a particular energy level in a particular series and are of significance only for identification. It is a peculiarity of the transitions from one energy level to another that these transitions can take place not in the same series (say the $p$ series) but must occur between adjacent series of levels (say between $p$ and $s$).

Since there are a number of paths along which a transition of energy can take place and since the energy levels reached along any particular path may differ from those reached by other paths, there are different emissions of light energy in intensity and frequency between the two paths. In order to maximize the production of any particular frequency it is desirable to increase flow to and hence the population of a particular and selected energy level.

It is therefore a primary object of this invention to provide a maser which has a resonance established which stimulates transitions tending to increase the population of a desired energy level, which increase in population will favor enhanced energy emission produced by transitions to a lower desired energy level.

It is a further object of this invention to provide a maser having a confined supply of particles which are capable of being excited at particular frequencies. This confined supply of particles is then exposed to a source of light energy containing a particular wave length. At least two pairs of parallel mirrors are provided which will produce two intersecting standing waves travelling between the opposed mirrors. One of the mirrors is only a partial reflector so that the light energy from a preselected standing wave can be observed externally.

Other objects and advantages will be apparent from the specification and claims and from the accompanying drawings which illustrate an embodiment of the invention.

FIG. 1 is a schematic illustration of an optical maser presently known in the art;

FIG. 2 is a diagrammatic illustration of certain energy levels and transition paths for cesium;

FIG. 3 is a schematic illustration of a double optical maser according to this invention;

FIG. 4 is a section taken along the line 4—4 of FIG. 3; and

FIG. 5 is a modified multiple optical maser.

Referring to FIG. 1, a chamber 10 is made of suitable transparent material which confines, for example, cesium in a suitable state. The cesium absorbs energy from a helium lamp 12 which emits light energy at a particular adapted wave length, for example, 3889 Angstroms. A pair of mirrors 14 and 16 reflect light energy and are chosen so as to produce a particular standing wave 18. The standing waves are made up of photons of light.

Mirror 16 is only a partial mirror and hence will transmit a particular (coherent) light which can be observed.

FIG. 2 represents a diagrammatic illustration of possible energy levels and transition paths. The fundamentals of this representation are set forth in the text book entitled "Atoms, Molecules and Quanta," by Arthur E. Ruark and Harold C. Urey, first edition, published by McGraw-Hill Company, Inc., New York (1930). The illustration of the energy levels of cesium is illustrated on page 187 of that text. It will be noted that the ground state of the particular cesium atom is indicated at the bottom of FIG. 2. By energizing the atom with a helium lamp thus providing a particular wave length, the atom is pumped up along the path 20 to the energy level $8_p$. It should be stated here that the levels specified are for illustration only. The subscript letters are grouped in vertical columns. Transitions can ordinarily occur only between adjacent columns, as shown.

It should be noted that once the energy level $8_p$ is reached, there are five paths, 20, 30, 31, 32 and 34 which the energy transition, or light release, can follow. The showing in FIG. 2 is merely representative and there may be other paths available into other levels.

In this particular instance it may be desirable to observe the light emitted on transition from the $5_d$ to the $6_p$ level. It is desirable therefore to increase as much as possible the flow to and hence the population of the atoms in the $5_d$ level. It is then the crux of this invention to add at least one more standing light wave such that although the transitions along different paths cannot be prevented, the possibility of increasing the population at the energy $5_d$ can be enhanced by favoring transitions ending at the $5_d$ level. Light emission along the path 38 will then be enhanced.

To this end, as seen in FIGS. 3 and 4, light source 40 (e.g. helium) is provided for penetration into a sealed chamber 42 containing cesium, for example. At least two pairs of mirrors 44, 46, 48 and 50 are provided. The particular reflective coatings on the mirrors may be silver or other suitable material, for example dielectric coatings. These coatings may be varied as desired to adjust the reflective qualities of the mirrors to provide the selected standing waves to be produced. In this respect the distance between the mirrors must have a predetermined relationship in order to establish the standing waves required for the stimulation of the particular coherent light. As will be noted in FIG. 3, the standing wave 54 between the mirrors 44, 46 is intended to produce an energy transition of the cesium from $8_p$ to $5_d$ level. On the other hand, the standing wave 56 between the mirrors 48, 50 is intended to produce an energy transition between the $5_d$ and $6_p$ level. The light from this last-mentioned energy transition is observed through the partial mirror 50. The provision of two intersecting standing waves contributes to the increased population at the $5_d$ level so that the particular transition from the $5_d$ to the $6_p$ level can be produced with increased efficiency.

FIG. 5 is a modification of this invention and illustrates an arrangement where more than two pairs of mirrors may be utilized to produce a selected number of standing waves of predetermined wave length. Thus, the pairs of mirrors 60, 62, 64, 66, 68, 70, 72 and 74 each are arranged at a predetermined distance from each other with a suitable reflective coating to produce a standing wave of predetermined wave length. One or more light sources 80 may be provided in the spaces between adjacent mirrors.

As a result of this invention, it will be apparent that a multiple optical maser has been provided which is of increased efficiency and may provide better production of the specific energy transitions desired.

Although several embodiments of this invention have been illustrated and described herein, it will be apparent that various changes and modifications may be made in the construction and arrangement of the various parts without departing from the scope of this novel concept.

We claim:

1. In a maser having a chamber, said chamber being transparent to electromagnetic waves, a material in said chamber having atoms which are susceptible to the absorption of energy of a predetermined frequency and capable of sustaining a population inversion, at least two pairs of diametrically opposed reflectors facing the interior of said chamber and forming at least two partly coincident resonant cavities wherein a pumping transition takes place to generate a population inversion and stimulated emission, one of said reflectors of one of said pairs being a partial reflector and being partially transparent to the said stimulated emission resulting from said population inversion, the cavity spacing of the other pair of reflectors being selectively resonant to radiation formed from a transition from an upper level excited state to an upper level of the said population inversion, and means providing a source of energy for energizing said maser material.

2. In a maser according to claim 1 wherein the reflectors of one pair are spaced apart a distance different than the reflectors of the other pair.

3. In a maser according to claim 1 wherein said at least two pair of reflectors produce two standing light waves.

4. In a maser according to claim 3 wherein said light waves are of different wave lengths.

References Cited by the Examiner
UNITED STATES PATENTS

| | | | |
|---|---|---|---|
| 2,929,922 | 3/60 | Schawlow et al. | 88—1 |
| 3,136,959 | 6/64 | Culver | 331—94.5 |

JEWELL H. PEDERSEN, *Primary Examiner.*